US008065694B2

(12) United States Patent  
Owens et al.

(10) Patent No.: US 8,065,694 B2  
(45) Date of Patent: Nov. 22, 2011

(54) REMOVABLE OPTICAL DISC STORAGE CARTRIDGE

(75) Inventors: John C. Owens, Arvada, CO (US); Leland Hawkins, Monument, CO (US)

(73) Assignee: Communications Capital Partners, LLC, Greenwood Village, CO (US)

( * ) Notice: Subject to any disclaimer, the term of this patent is extended or adjusted under 35 U.S.C. 154(b) by 641 days.

(21) Appl. No.: 11/607,189

(22) Filed: Dec. 1, 2006

(65) Prior Publication Data

US 2007/0130579 A1    Jun. 7, 2007

Related U.S. Application Data

(60) Provisional application No. 60/741,563, filed on Dec. 2, 2005.

(51) Int. Cl.  
*G11B 23/03* (2006.01)

(52) U.S. Cl. ............ 720/732; 720/614; 369/30.83

(58) Field of Classification Search ............ 369/30.83, 369/30.68, 30.77, 30.82; 720/718, 657, 736, 720/725, 614, 732; 360/92, 96.4  
See application file for complete search history.

(56) References Cited

U.S. PATENT DOCUMENTS

| | | | | |
|---|---|---|---|---|
| 5,200,938 A | * | 4/1993 | Akiyama et al. | 369/30.83 |
| 5,576,911 A | * | 11/1996 | Porter | 360/98.06 |
| 5,613,745 A | * | 3/1997 | Cho et al. | 312/9.9 |
| 5,729,464 A | * | 3/1998 | Dimitri | 700/215 |
| 5,956,300 A | * | 9/1999 | Chigasaki | 369/30.32 |
| 6,298,017 B1 | * | 10/2001 | Kulakowski et al. | 369/36.01 |
| 6,614,751 B1 | * | 9/2003 | Katao | 720/736 |
| 2001/0044877 A1 | * | 11/2001 | Kanazawa et al. | 711/111 |
| 2002/0172108 A1 | * | 11/2002 | Moreira et al. | 369/30.36 |
| 2006/0005217 A1 | * | 1/2006 | Leonhardt et al. | 720/725 |

* cited by examiner

*Primary Examiner* — Mohammad Ghayour  
*Assistant Examiner* — Tamara Ashford  
(74) *Attorney, Agent, or Firm* — Patton Boggs LLP (57) ABSTRACT

The removable optical disc storage cartridge stores a plurality of optical disc media in a substantially stacked orientation for later extraction and presentation to a picker in an optical disc storage library. Each optical disc media is stored on a separate extractor that slides between a retracted and a stored position. An extractor tab, accessible outside or inside of the removable optical disc storage cartridge, is connected to each one of the extractors located within the removable optical disc storage cartridge. The removable optical disc storage cartridge further includes a security front door that operates between a closed and open position and further includes a locking element. The locking element may be operated by the picker or a release element contained on a magazine that handles multiple disc storage cartridges. The removable optical disc storage cartridge also includes seals to prevent dust from entering the removable optical disc storage cartridge.

16 Claims, 7 Drawing Sheets

REMOVABLE OPTICAL DISC STORAGE CARTRIDGE

FIELD OF THE INVENTION

This invention relates to data storage systems and, in particular, to a removable optical multi-disc storage cartridge for use in an optical disc storage system.

Problem

It is a problem in the field of data storage systems to provide sufficient data storage capacity that keeps pace with the ever increasing data output of today's networks and computing systems. In addition, it is a problem to provide this increased data storage capacity in a long-term storage format for use in today's vertical racks. Many attempts have been made to increase the data storage capacity of data storage systems, reduce the data storage access time, and to provide the data storage medium in smaller component sizes.

For instance, magnetic tape data storage systems have provided increased data storage capacity over time due to innovations, such as multiple tape cartridge bay doors to enable tape drives to directly access multiple magnetic tape cartridges in bulk load format. In addition, automated magnetic tape cartridge library systems have been developed to transport magnetic tape cartridges to and from a tape drive by rotating the magnetic tape cartridges on a track, either vertically or horizontally, within the automated magnetic tape cartridge library storage system. Magnetic tape cartridges are oftentimes stored outside of the automated magnetic tape cartridge library storage system when they are full of data for later use when needed; however, this storage option exposes the magnetic tape cartridge to the dust and elements such as magnetic fields, excess temperatures, shock, and winding pressures, which can be detrimental to data integrity. To improve data integrity in only one of these areas, magnetic tape cartridges oftentimes employ barriers, such as mechanical doors, to prevent dust from destroying the data on the magnetic tape itself. The other detrimental components have little or no safeguards to these exposures.

Automated magnetic tape cartridge library systems, are widely accepted because they combine multiple magnetic tape cartridges and a tape drive within a single chassis for higher data storage capacity. Typically, automated magnetic tape cartridge library systems have an array of storage positions for magnetic tape cartridges, one or more tape drives, and some type of robotic mechanism or cartridge transport for picking or gripping a magnetic tape cartridge and moving the magnetic tape cartridge between the storage position and the tape drive.

Due to the extra motors, tracks, and mechanical parts contained in an automated magnetic tape cartridge library system, its chassis height is generally taller than conventional magnetic tape data storage systems, thus causing reconfiguration of existing vertical racks to accept its chassis. Attempts have been made to decrease the chassis height of the automated magnetic tape cartridge library systems; however, these efforts have created additional problems, such as yet additional motor mechanisms for moving the tape drive read/write head to read from and write to each of the multiple magnetic tape cartridges.

Regardless of the orientation or number of magnetic tape cartridges within the automated magnetic tape cartridge library system, many problems and limitations are associated with the use of magnetic tape. First, to locate a specific sector on the magnetic tape, it must be wound backward and forward to get the specific sector located under the tape drive read/write heads and this combination of motions causes the magnetic tape to stress and stretch via tension and wear through head contact and edge guiding contact, which is detrimental to data integrity. Second, magnetic tape cartridges are written to and read from by a single tape drive at a time, thus only a single particular sector on the magnetic tape can be written to or read from at any one time. Third, automated magnetic tape cartridge library systems that fit within a one "U" form factor store their magnetic tape cartridges on their side in a horizontal orientation, which causes slipping of the pack and folding of the tape edges, which deteriorates and damages the magnetic tape over time. Fourth, magnetic tape does not wind perfectly smooth each time it is used, thus "popped strand outs" and "foldovers" are created that further deteriorate and damage the magnetic tape such that it has difficulty guiding in the complex tape path. Finally, magnetic tape is not capable of being "cleaned" in a conventional sense like optical discs as its recording surface winds on itself and is not available for cleaning. Thus, once a magnetic tape becomes contaminated with dirt, dust, or grime it must be sent off for expensive data recovery, while the entire recording surface of optical discs is accessible and can be wiped clean by an operator.

A dramatic improvement over magnetic tape was created with the invention of optical storage discs. In 1982, SONY and Philips first introduced the red laser 120 mm CD audio disc. Driven by record high volumes in the consumer segment, 120 mm has produced the greatest decrease in cost, the highest increase in area density, and the most significant improvement of any digital recording technology. Some examples of optical storage discs are CD-RW, CD-ROM, and CD-Recordable. Due to their low cost, these initial products were soon adapted for data storage, but they received a tepid reception for use in the data storage world due to their limited data storage capacity of 650 MB. To increase the effective data storage capacity available with this media, optical discs were automated into jukeboxes that housed multiple optical storage discs. Further developments followed with the advent of the red laser 120 mm DVD technology, which advanced the acceptance of 120 mm optical discs even further. This made the DVD ideal for data storage and automation with capacities approaching 5 GB per disc side and with data transfer rates of 4 MB/sec. This paradigm shift in capacity enabled the DVD to challenge the 5.25" magneto-optical (MO) products as well as mid range tape.

120 mm optical disc technology advanced again with the announcement from SONY of blue laser based Professional Disc for Data (PDD) products. Derived from the Blu-ray consortium for the consumer user, this technology advancement offers nearly 24 GB of storage capacity per disc side with data transfer rates of 11 MB/sec and with disc costs comparable to DVD per side. Blue laser systems are able to store more data than red laser systems because of the shorter wavelength of blue light, which makes a smaller spot on the recording layer, thus requiring less space for each bit of data.

Generally, optical disc storage systems utilize one optical disc at a time, which are contained within a jewel case or are stored bare within the system. Attempts have been made to increase the data storage capacity of these systems by storing several bare optical discs in a "jukebox" type of magazine. A picker then "picks" a particular optical disc from the jukebox and transports it to the disc drive for reading and writing operations. The bare storage optical discs are manually loaded into the jukebox magazine, are not easily removable from the optical disc storage system, are not protected from damage, and offer no data security. In other jukebox arrangements, the magazines are removable, thus exposing the bare optical discs to dust particles that are damaging to the data on the discs.

Currently, optical disc technology is concentrated on the consumer driven market of audio and video products, such as audio CDs, video games, and DVD movies. Typically, these uses do not require data storage beyond that provided by a single DVD red laser disc. Thus, this market generally employs disc drive devices that read only one side of the optical disc, but not the other. Developments in this consumer driven technology are concentrated on increasing the storage volume of a single side of the optical disc and decreasing the bit footprint on the disc surface of the optical disc by using shorter wavelength lasers, such as those employed with blue laser technology. Nevertheless, data storage applications involving optical storage devices and libraries have been limited by the use of either single optical storage discs or magazines that handle bare discs, but that are susceptible to contaminants when handled outside of the data storage device or library.

One attempt to use cartridges for optical storage discs can be found in Leonhardt et al., (U.S. Pat. No. 5,253,246). This reference discloses a removable universal data storage element that uses a standard tape cartridge form factor that is capable of containing various formats of storage media, such as magnetic tape, solid state memory and magnetic or optical discs. These various storage media can then be accessed either inside the cartridge or outside the cartridge. In cases where the media is accessed outside of the cartridge, a carriage member is used to transport the media outward from the cartridge itself to a drive element. These various types of storage media are then processed in a library subsystem using various desired drive elements. To ensure that a particular cartridge containing a particular media is matched with its compatible drive, identification means, such as a physical or optical feature is encoded on the universal data storage element. For example, Leonhardt discloses modifying the leader block so that only an appropriate match of the mounting pin and leader is accomplished or by marking the outside of the universal data storage element with a pattern of ridges that are detected by a roller equipped microswitch or an optical sensor.

Therefore, there is a need for a removable optical disc storage cartridge that contains several optical discs for use in an optical disc storage library for significantly increasing the capacity of the optical disc storage library. In addition, a further need exists for the removable optical disc storage cartridge to be sealed to prevent dust from accessing the surfaces of the optical discs while being able to operate within the optical disc storage library.

Solution

The present removable optical disc storage cartridge provides a dust-free environment for the storage and access of a plurality of optical discs by at least one disc drive. The removable optical disc storage cartridge comprises a plurality of optical disc extractors; each extractor holds an optical disc within the removable optical disc storage cartridge and presents the optical disc to a picker for transportation to at least one disc drive in an optical disc storage library. The removable optical disc storage cartridge can be used in a horizontal or vertical orientation for efficient use within the chassis of the optical disc storage library.

The removable optical disc storage cartridge further includes a security front door that is located on one of its ends and provides a secure and dust-free barrier for an air tight chamber for the optical discs contained within. The extractors include extractor tabs that operate within sealed channels to prevent dust from accessing the interior of the removable optical disc storage cartridge during storage.

Several removable optical disc storage cartridges are placed into storage cells of a magazine for easy loading and unloading of a plurality of removable optical disc storage cartridges into the optical disc storage library. This loading and unloading can occur by partially moving the magazine through the media loading door to expose a predetermined number of the storage cells to enable the user to insert/extract a plurality of removable optical disc storage cartridges in the predetermined number of storage cells.

Customers benefit from reduced costs, increased reliability and data integrity, and greater ease of use with these removable optical disc storage cartridges. The removable optical disc storage cartridges store and transport all types of 120 mm optical discs, uniform or mixed format, and allow the coexistence of conventional red laser 120 mm DVD technology with the latest blue laser 120 mm blue laser optical drives and media in the same library system.

SUMMARY

The invention provides a removable optical disc storage cartridge for use in an optical disc storage library and includes a plurality of track means located within the removable optical disc storage cartridge; a plurality of extractor means, each of the plurality of extractor means located on a separate one of the plurality of track means, for holding an optical disc media in each of the plurality of extractor means in a substantially stacked orientation; a plurality of individual extractor tabs, each of the plurality of individual extractor tabs accessible outside of the removable optical disc storage cartridge and connected to one of said plurality of extractor means for slideably moving the one of said plurality of extractor means between a retracted position and an extended position through an opening in the removable optical disc storage cartridge; and a closure means for sealing the opening of the removable optical disc storage cartridge.

Preferably, the removable optical disc storage cartridge further includes an extractor tab sealing means for preventing contaminants from entering the removable optical disc storage cartridge. Preferably, each of the plurality of track means includes: two opposing lateral track means inwardly facing each other extending substantially the length of said removable optical disc storage cartridge. Preferably, the removable optical disc storage cartridge further includes: a lock means for locking the closure means to prevent a user from removing the plurality of optical discs from the removable optical disc storage cartridge. Preferably, the removable optical disc storage cartridge further includes: a release means for releasing the lock means to enable a picker in the optical disc storage library to open the closure means. Preferably, the removable optical disc storage cartridge further includes: a cartridge identifier that contains information related to the plurality of optical disc media stored within the removable optical disc storage cartridge. Preferably, the cartridge identifier is a barcode. Preferably, the cartridge identifier is a RFID chip. Preferably, the information is selected from the group consisting of optical disc media identification, optical disc media format, optical disc media size, optical disc media capacity, and optical disc media manufacturer. Preferably, the optical disc media includes a barcode located near the hub of the optical disc media, the barcode containing information selected from the group consisting of optical disc media identification, optical disc media format, optical disc media size, optical disc media capacity, and optical disc media manufacturer. Preferably, the removable optical disc storage cartridge further includes: automation grip means for providing a grippable portion of the removable optical disc storage cartridge to a transport means located within the optical disc storage library.

DETAILED DESCRIPTION OF THE DRAWINGS

The removable optical disc storage cartridges are for use in an optical disc storage library and standalone drives. In the preferred embodiment, the orientation of the elements, such as top and bottom, has the usual meaning relative to an optical disc storage library, meaning that the removable optical disc storage cartridges are used in a horizontal orientation. In another embodiment, the orientation of the removable optical disc storage cartridges is on their side in a vertical orientation for use in an optical disc storage library where the optical discs are used in a vertical orientation. In addition, in one embodiment, the front of the optical disc storage cartridge may face the picker and in another embodiment the back of the optical disc storage cartridge may face the picker of an optical disc storage library.

The removable optical disc storage cartridge is capable of storing and transporting mixed media, such as optical discs and magnetic optical (MO) discs. In addition, the removable optical disc storage cartridge may be used with all optical disc formats regardless of the reading and writing technology employed for a particular optical disc. For instance, the removable optical disc storage cartridge may be used with red laser technology optical discs or blue laser technology optical discs, or both. Some common optical discs formats include Ultra Density Optical (UDO), CD, DVD, Advanced Optical Disc (AOD), HD DVD and Professional Disc for Data (PDD), or other optical disc formats commonly used. In addition, the removable optical disc storage cartridge may be used with optical discs that have data on one or both sides of the disc. The removable optical disc storage cartridge may be used with different sized optical discs, such as optical discs having a diameter of 120 mm, 130 mm, or both.

Figure 1:
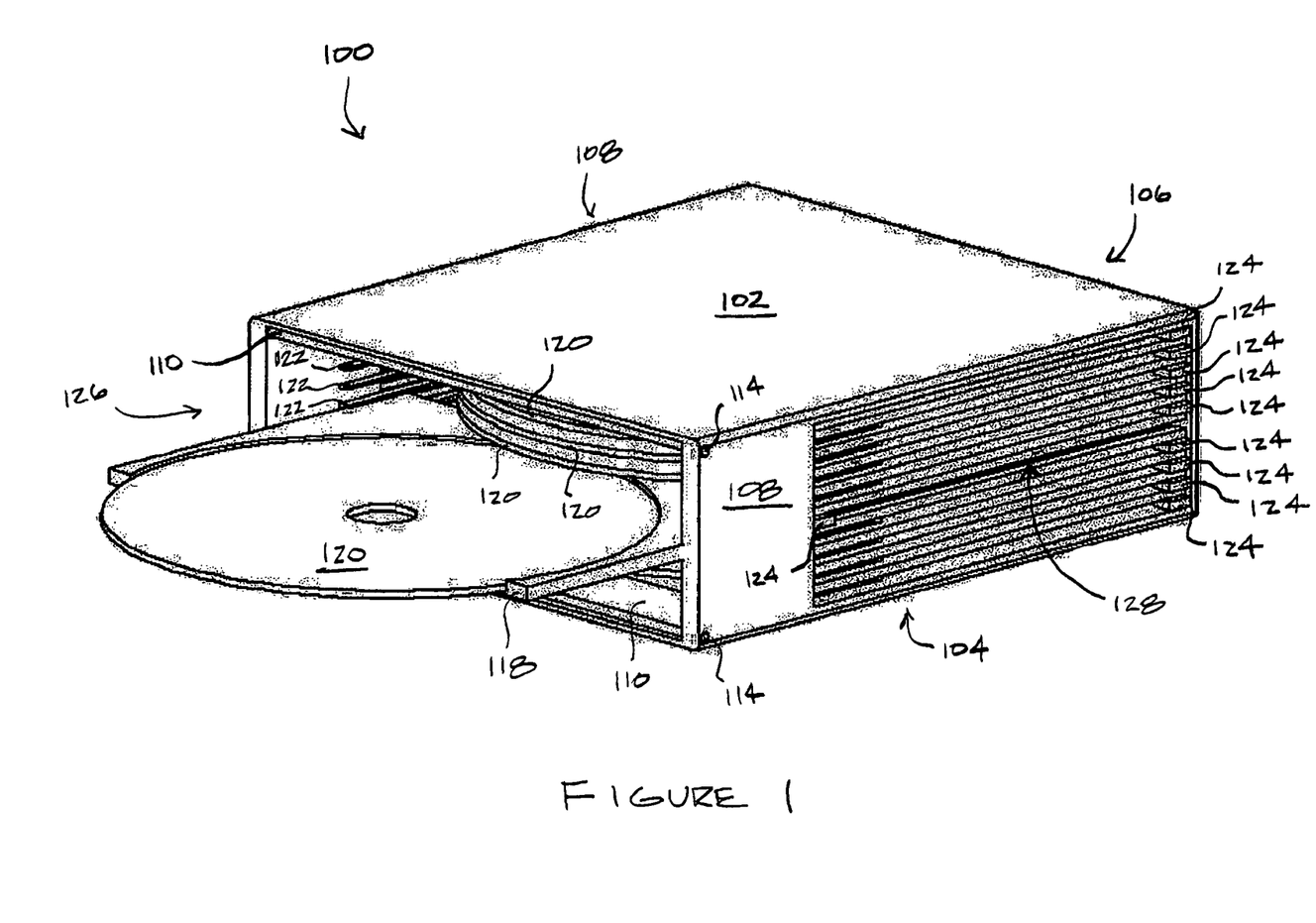
FIG. 1 illustrates a perspective view of an embodiment of the present removable optical disc storage cartridge depicting a two-piece security front door opened and an extractor and optical disc in an extended position.

FIG. 1 illustrates a side view of an embodiment 100 of the present removable optical disc storage cartridge. Referring to FIG. 1, in one embodiment, the removable optical disc storage cartridge 100 is generally rectangular in shape and consists of a top 102, bottom 104, back 106, front 126, and sides 108. These elements form a cavity within the removable optical disc storage cartridge 100 where several optical discs 120 are stored. Each optical disc 120 is securely held in place by extractors 118 that slide on tracks 122 within the removable optical disc storage cartridge 100 to move the optical discs 120 to and from a picker (not shown) for transport to at least one drive unit (not shown) of an optical disc storage library (not shown).

The removable optical disc storage cartridge 100 includes a two-piece security front door 110 located on the front 126 of the removable optical disc storage cartridge 100. The security front door 110 opens to expose the extractors 118 and optical discs 120 and closes to form an airtight seal against the top 102, bottom 104, and sides 108 of the removable optical disc storage cartridge 100. In one embodiment, the removable optical disc storage cartridge 100 includes a hinge 114 for providing rotatable support for the security front door 110. In one embodiment, slots 128 are provided to enable extractor tabs 124 to connect and operate with the extractors 118 to slide the extractors 118 between an extended and retracted position. In FIG. 1 a slot is shown behind the extended extractor 118. Though only one slot 128 is shown in FIG. 1, the others associated with the other extractor tabs 124 and extractors 118 are not shown because they are blocked by their respective retracted extractor 118.

Figure 2:
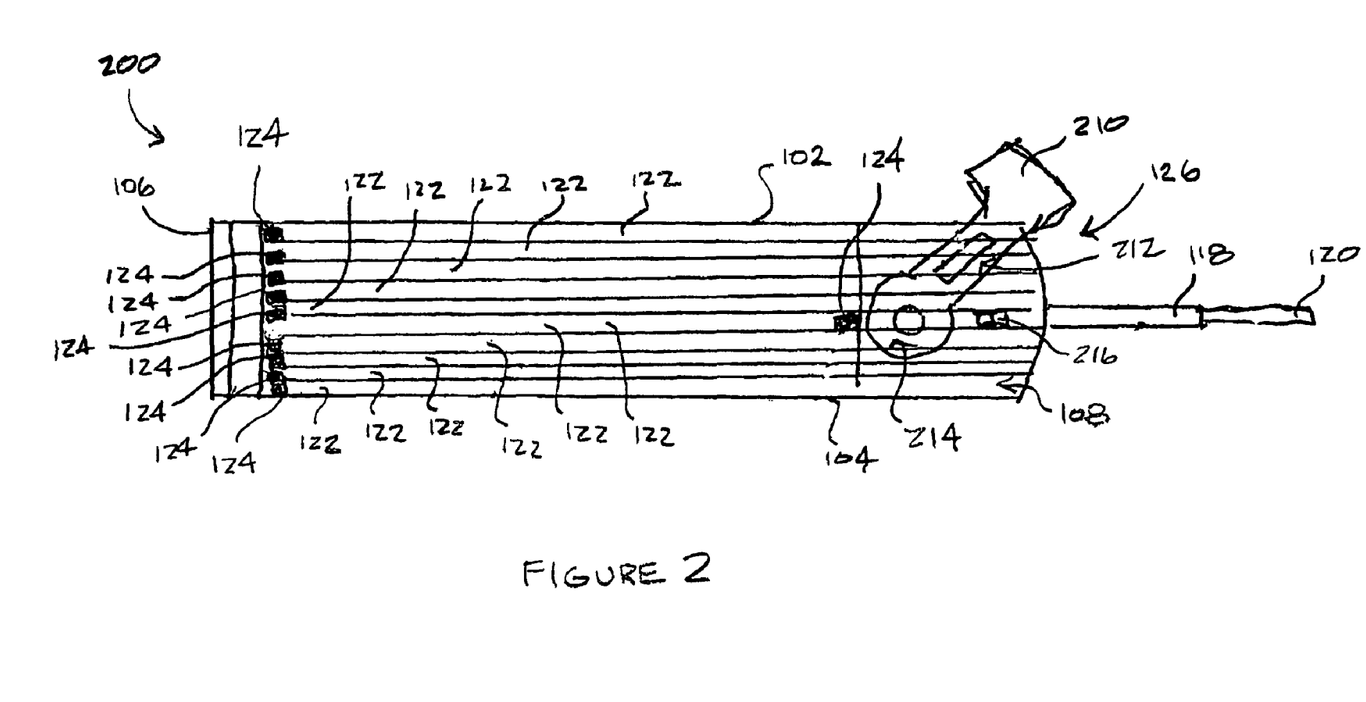
FIG. 2 illustrates a side plan view of another embodiment of the present removable optical disc storage cartridge depicting a one-piece security front door opened and an extractor and optical disc in an extended position.

FIG. 2 illustrates a side view of another embodiment 200 of the present removable optical disc storage cartridge, which includes many similarly numbered elements as found in FIG. 1 that correlate to the same description described herein. In addition to those similarly numbered and described elements, removable optical disc storage cartridge 200 includes a one-piece security front door 210, hinge 214, and a security tab slot 212 that engages a security tab 216 for securely locking the one-piece security front door 210 to prevent unauthorized access to the optical discs 120.

In one embodiment, the picker interacts with the security front doors 110 and 210 to operate the security tab slot 212 (not shown in FIG. 1) or the security tab 216 (not shown in FIG. 1), or both. Then the picker further interacts with the security front doors 110 and 210 to open and later close the security front doors 110 and 210. In another embodiment, a mechanical arm separate from the picker operates the tab slot 212, the security tab 216, or the security front doors 110 and 210, or some or all of them.

The extractors 118 slide forward and backward between a retracted position and an extended position within the cavity of the removable optical disc storage cartridges 100 and 200. As shown in FIGS. 1 and 2, extractor 118 is in the extended position and is shown beyond the front 126 of the removable optical disc storage cartridges 100 and 200. The extractors 118 are connected to extractor tabs 124 that are accessible externally to the removable optical disc storage cartridges 100 and 200, thus when a particular extractor tab 124 is moved in a forward or backward direction the extractor 118 connected to that particular extractor tab 124 is also moved similarly. In another embodiment, the extractor tabs 124 are accessible to the picker inside of the removable optical disc storage cartridges 100 and 200. The number of extractors 118 contained within the cavity of the removable optical disc storage cartridges 100 and 200 may vary depending on a desired application. In the preferred embodiment, the removable optical disc storage cartridges 100 and 200 contain ten extractors 118 and accordingly ten extractor tabs 124. More-over, the extractor tabs 118 may be on either or both sides of the removable optical disc storage cartridges 100 and 200.

Figure 3:
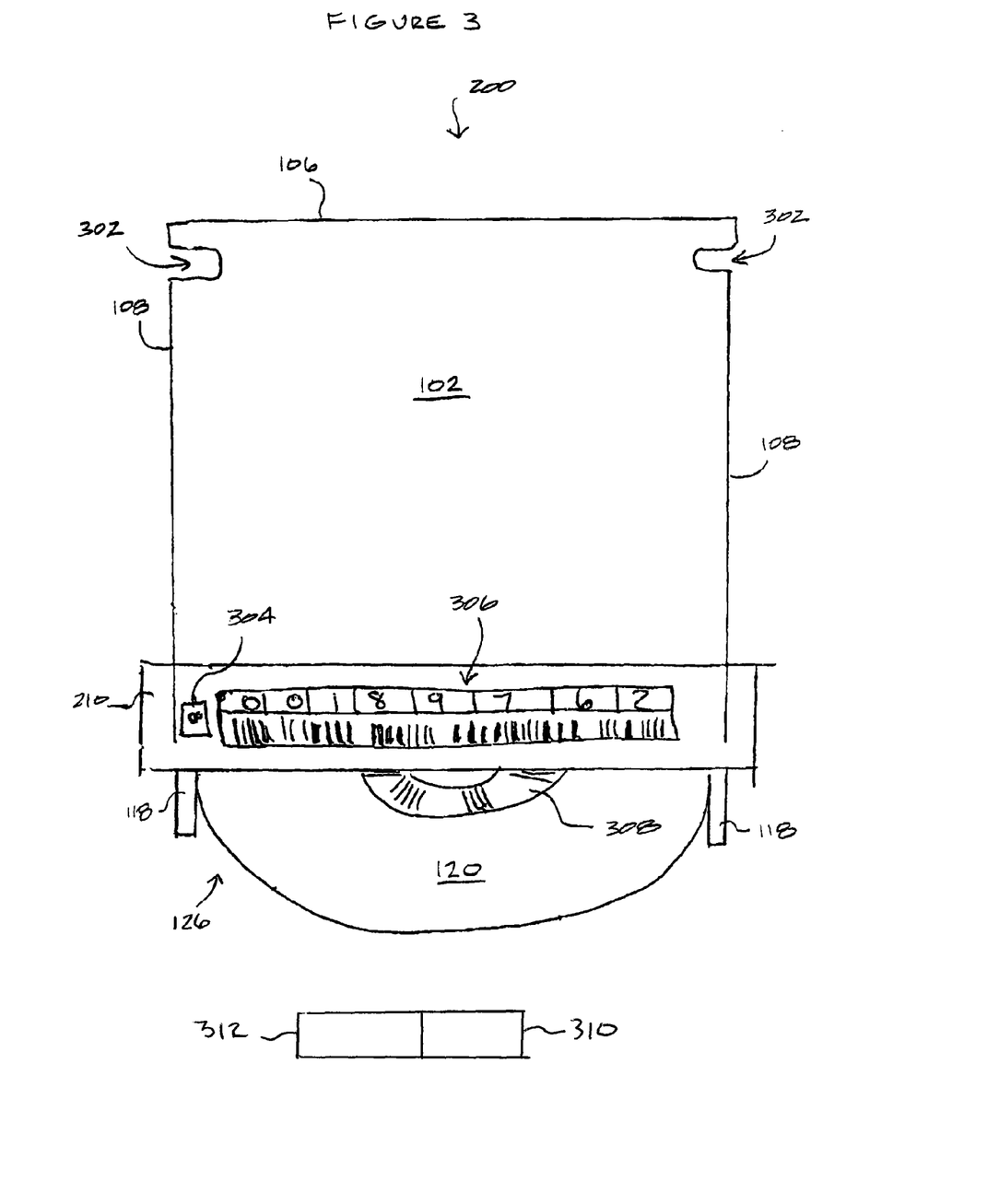
FIG. 3 illustrates a top plan view of the present removable optical disc storage cartridge of the embodiment shown in FIG. 2.

FIG. 3 illustrates a top plan view of the removable optical disc storage cartridge 200, which shows two automation grip notches 302 near the back 106 of removable optical disc storage cartridge 200. Though not shown, removable optical disc storage cartridge 200 may also include these automation grip notches 302. In one embodiment, a picker (not shown) grips the removable optical disc storage cartridges 100 and 200 by these automation grip notches 302 and transports the entire removable optical disc storage cartridges 100 and 200 to the disc drive (not shown). In this embodiment, the back 106 of the removable optical disc storage cartridges 100 and 200 are oriented to face the picker. In another embodiment, the front 126 of the removable optical disc storage cartridges 100 and 200 are oriented to face the picker.

In one embodiment, the removable optical disc storage cartridges 100 and 200 include radio frequency identification (RFID) chip 304 (not shown in FIG. 1), for reading by a RFID reader, that contains identification information regarding the cartridge and additional information related to the optical discs located within the removable optical disc storage cartridges 100 and 200. In another embodiment, the removable optical disc storage cartridges 100 and 200 include a cartridge ID barcode 306 (not shown in FIG. 1) that contains identification information regarding the cartridge and additional information related to the optical discs 120 located within the removable optical disc storage cartridges 100 and 200. Removable optical disc storage cartridge 100 may also include the RFID chip 304, cartridge ID barcode 306, or both. In yet another embodiment, either or both of the RFID chip 304 and the cartridge ID barcode 306 may be used. Some additional exemplary information that may be contained on the RFID chip 304 or the cartridge ID barcode 306, or both, include information related the presence or absence of a particular cartridge, the type of cartridge, etc.

In an embodiment, any information related to a particular optical disc 120 is contained on the radial media ID barcode 308 that is located on the inner portion of the optical disc 120. In this embodiment, this information is standard barcode that is read by the picker itself as the optical disc 120 is presented to the picker. In another embodiment, a reader separate from the picker or connected to the picker reads the radial media ID barcode 308 in a conventional linear manner. In this embodiment, the reader may read the radial media ID barcode 308 in a circular or radial fashion without having to spin the optical disc 120. Some exemplary information that may be contained on the radial media ID barcode 308 include: disc format (red or blue laser), disc capacity, disc manufacturer, etc.

Figure 4:
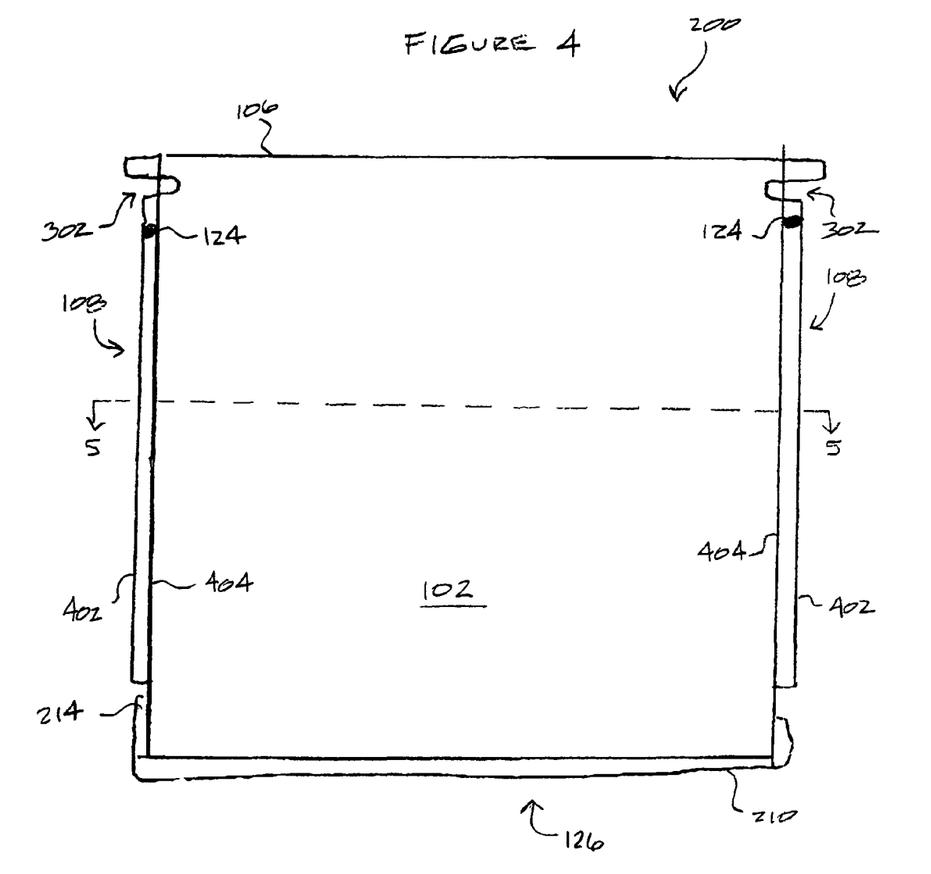
FIG. 4 illustrates a top plan view of the present removable optical disc storage cartridge of FIG. 2 depicting an inner side wall and an outer side wall.

FIG. 4 illustrates a top plan view of the removable optical disc storage cartridge 200 that shows the outer side wall 402 and the inner side wall 404 of a side 108. Removable optical disc storage cartridge 100 preferably includes an outer side wall 402 and inner side wall 404. The outer side wall 402 and inner side wall 404 are structurally such that they keep the cavity of the removable optical disc storage cartridges 100 and 200 air tight during storage of the optical discs 120. The inner side wall 404 and outer side wall 402 preferably contain slots 128 (as shown in FIG. 1) for allowing the extractor tabs 124 to connect to the extractors 118 inside the removable optical disc storage cartridges 100 and 200. These slots 128 are blocked by each extractor 118 associated with that particular slot 128.

Figure 5:
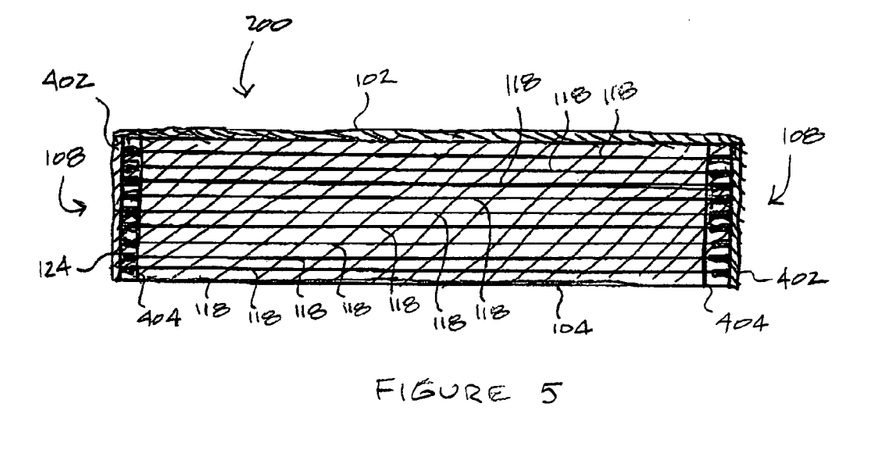
FIG. 5 illustrates a cross-section view of the present removable optical disc storage cartridge of FIG. 4 through lines 5-5 depicting the spacing of the extractors.

FIG. 5 illustrates a cross-section of the removable optical disc storage cartridge 200 through 5-5 of FIG. 4. The extractors 118 of the removable optical disc storage cartridge 200 are shown spaced apart from each other within the cartridge.

In one embodiment, the spacing between the extractors 118 is such that it provides spacing of approximately 0.060 of an inch between the optical discs 120 when they are stored within the removable optical disc storage cartridges 100 and 200. Although FIGS. 1-5 illustrate ten extractors 118, the present removable optical disc storage cartridges 100 and 200 may use any number of extractors 118 as desired. The spacing between the extractors 118 may be any distance such that it provides sufficient clearance between adjoining optical discs 120 without them coming into contact with each other.

Figure 6:
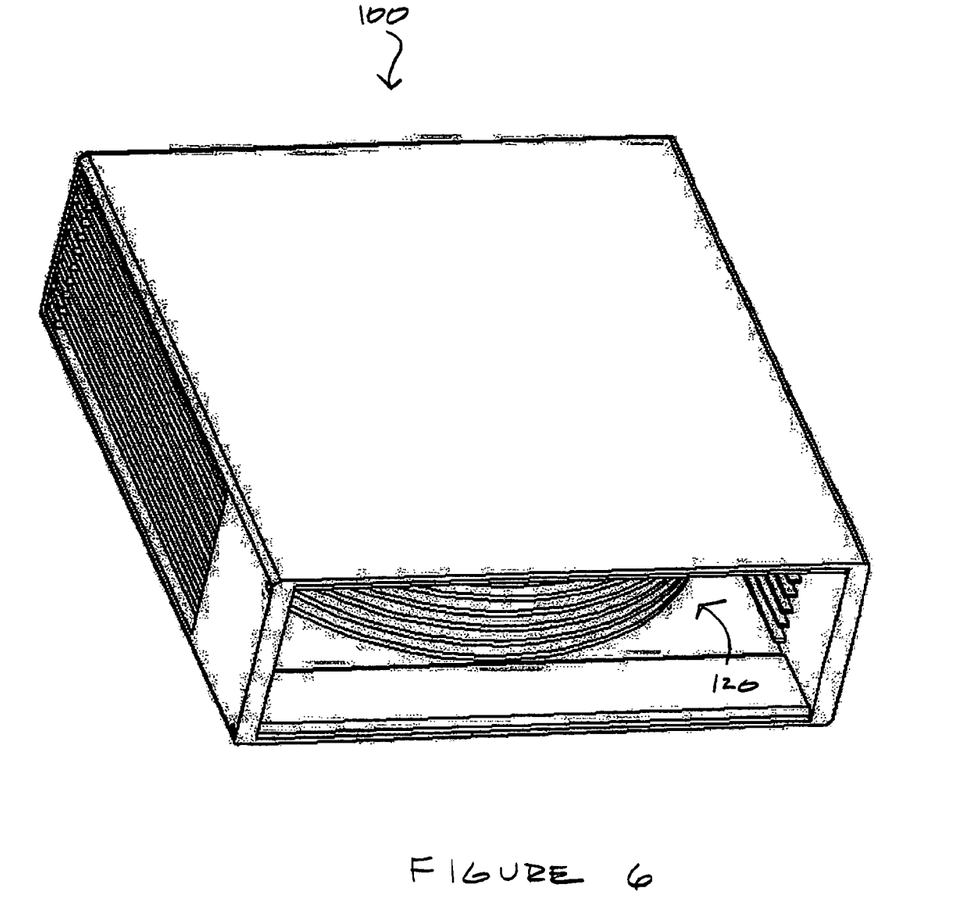
FIG. 6 illustrates a perspective view of the present removable optical disc storage cartridge of FIG. 1.
Figure 7:
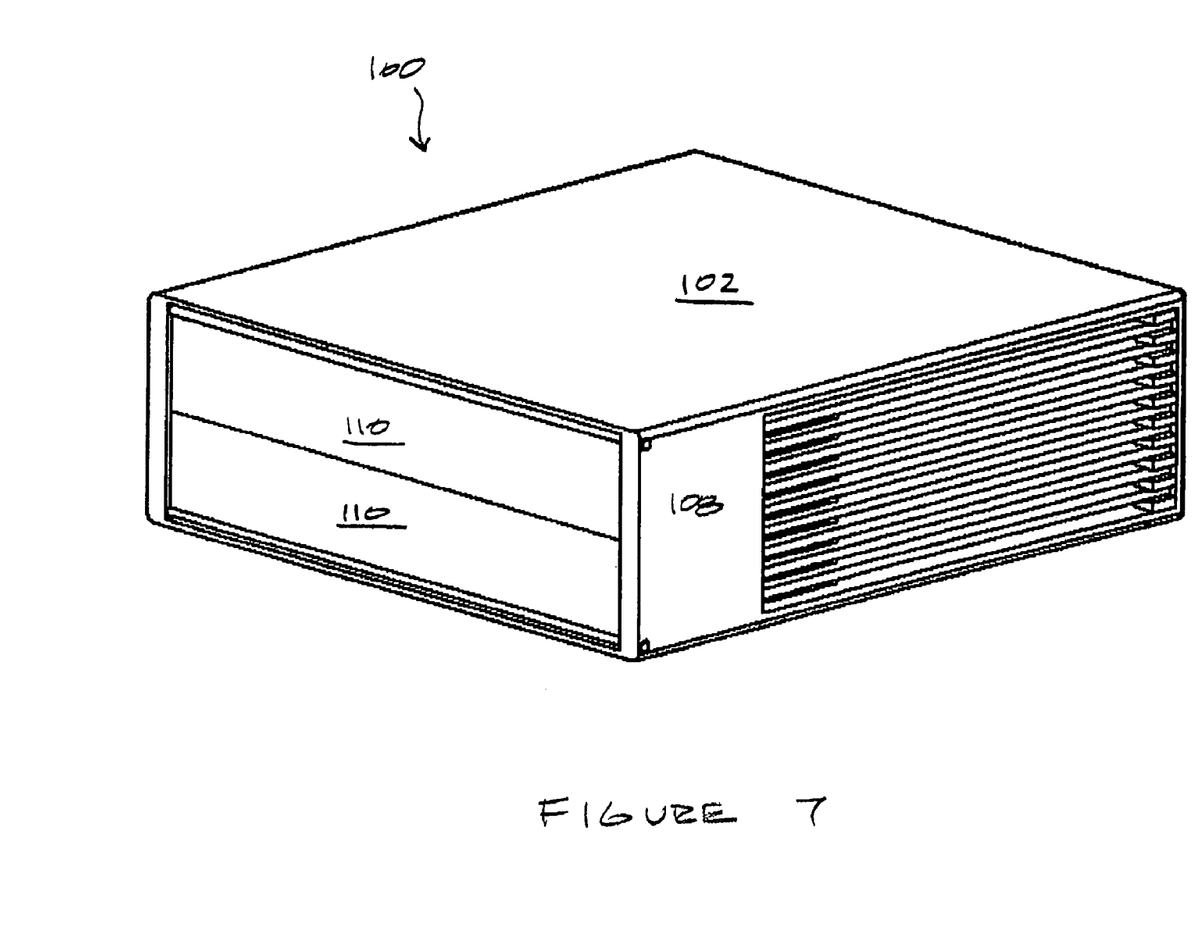
FIG. 7 illustrates a perspective view of the present removable optical disc storage cartridge of FIG. 1 depicting the two-piece security door in a closed position.

FIG. 6 illustrates a perspective view of removable optical disc storage cartridge 100 with the optical discs 120 in their stored position. In addition, FIG. 7 illustrates a perspective view of removable optical disc storage cartridge 100 with the optical discs 120 in their stored position and the security front doors 110 in a closed position.

Removable magazines (not shown) may be used to store several removable optical disc storage cartridges 100 and 200 at one time in either a horizontal or vertical orientation. Removable magazines for the removable optical disc storage cartridges 100 and 200 are used to cut down on the time required to load and unload the removable optical disc storage cartridges 100 and 200 from an optical disc storage library. Typically, the removable optical disc storage cartridges 100 and 200 are loaded onto a removable magazine and then it is loaded through a media door on the optical disc storage library. A picker located within the optical disc storage library then picks a particular optical disc or discs 120 from a removable optical disc storage cartridges 100 and 200 located on the removable magazine or it picks an entire removable optical disc storage cartridge 100 to be presented to a disc drive. Once a removable magazine is removed from an optical disc storage library, the removable optical disc storage cartridges 100 and 200 can be removed from the removable magazine it can be stored outside of the optical disc storage library for future use. In addition, removable magazines can be stored outside of the optical disc storage library with removable optical disc storage cartridges 100 and 200 in place for future use.

As discussed above, the security front doors 110 and 210 may be located on the front 126 of the removable optical disc storage cartridges 100 and 200. In one embodiment, the security front door 210 is comprised of a single piece of material and opens and closes via hinge 214. In another embodiment, the security front door 110 may be comprised of multiple pieces and opens and closes via hinge 114. In either embodiment, it is a novel aspect of the present removable optical disc storage cartridges 100 and 200 that the security front doors 110 and 210 create an airtight seal between themselves and their adjoining structure as noted above. In one embodiment, this airtight seal is created by ridges formed on the security front doors 110 and 210 and the adjoining the top 102, bottom 104, and sides 108 that interlock, overlap, or mesh together to create a barrier to prevent dirt and dust from entering the removable optical disc storage cartridges 100 and 200. Other mechanical means can be employed, such as rubber seals, Teflon® seals, fabric seals, etc.

As noted above, in one embodiment, the tab slot 212 and tab 216 works together to securely lock the security front door 210 in a locked closed position. In one aspect, the picker operates the tab 216 by exerting a mechanical force on the tab 216 so that it is pushed inward, thus away from the tab slot 212, so that the security front door 210 may be opened. The picker then mechanically opens the security front doors 110 and 210. In a multi-piece embodiment, the pieces may be connected by a mechanical hinge that operates both doors as the picker operates on just one of the doors. In another aspect, the pieces may be operated individually or separately by the picker.

In one embodiment, the picker employs one motor that operates a mechanical arm to mechanically operate the tab 216 and the security front doors 110 and 210. In another embodiment, the picker employs multiple motors and mechanical arms to mechanically operate the tab 216 and the security front doors 110 and 210. Other locking means may be employed for securing the front doors 110 and 210 in place of or in addition to the tab 216 and the tab slot 212. These additional locking means may include dowels, grooves, holes, pins, locks, detents, catches, magnetic/electrical closures, etc.

The arm of the picker hooks or engages the extractor tabs 124 to operate the extractors 118 of the removable optical disc storage cartridges 100 and 200. One or both extractor tabs 124 of any one extractor 118 may be engaged with the arm of the picker. The picker then pulls the extractor tab 124 toward the picker, thus bringing the optical disc 120 to the fully extended position. Once the desired optical disc 120 is extracted or removed from the removable optical disc storage cartridges 100 and 200, the picker then returns the empty extractor and closes the security front doors 110 and 210.

In an embodiment, the arm of the picker that operates the security front doors 110 and 210 includes the RFID reader, barcode reader, or both, for reading the RFID chip 304, cartridge ID barcode 306, or both for inventorying the removable optical disc storage cartridges 100 and 200 contain within a removable magazine and the optical discs 120 contained within a particular removable optical disc storage cartridges 100 and 200. In another embodiment, the picker and the RFID reader 310, barcode reader 312, or both, for reading the RFID chip 304, cartridge ID barcode 306, or both are separate parts. An inventory of the existing the removable optical disc storage cartridges 100 and 200 located within an optical disc storage library occurs during the powering up of the optical disc storage library or by new media introduction by the RFID reader 310 or barcode reader 312. This operation inventories whether a particular cell in a removable magazine contains a removable optical disc storage cartridges 100 and 200.

The information contained on the RFID chip 304 or the cartridge ID barcode 306 preferably contains information regarding those optical discs 120 contained within removable optical disc storage cartridges 100 and 200. In part this information is useful in identifying the removable optical disc storage cartridges 100 and 200 that a particular optical disc 120 should be returned to after power re-initiation following a loss of power. Following the powering up of an optical disc storage library, the picker will determine the identification of an optical disc 120 in its possession by the radial media ID barcode 308 and will be able to return that optical disc 120 to its proper removable optical disc storage cartridges 100 and 200.

The dimensions of the removable optical disc storage cartridges 100 and 200 are dependent upon the number of extractors 118 used for a particular design. In one embodiment, the removable optical disc storage cartridges 100 and 200 are designed to be used with retrofitted existing tape drives and tape library systems. For instance, when using ten extractors 118 as shown in FIGS. 1-7, the removable optical disc storage cartridge 100 has the general dimension of approximately 5.0 inches in width, 5.0 inches in length, and 1.0 inches in height.

In an embodiment, the extractors 118 are horseshoe-shaped or substantially U-shaped (as shown in FIG. 1) such that the ends of the extractor extend outward from the front 126 of the removable optical disc storage cartridges 100 and 200 as the optical disc 120 is extracted. In one embodiment, the extractor 118 has a groove that extends generally along the inside perimeter of its shape. This groove provides the support for holding and ejecting an optical disc 120 without scratching the surfaces of the optical disc 120. In this embodiment, the extractor has a width that is slightly less than the distance between the two tracks 122 that contains it. This way the extractor slides in and out between an extended and a retracted position. In another embodiment, the extractor 118 may be of any shape or size to accommodate a particular design or use.

The top 102, bottom 104, sides 108, and security front doors 110 and 210 of the removable optical disc storage cartridges 100 and 200 are typically made by a molding process or assembled from molded or manufactured parts, and it is made from a rigid moldable material. Some exemplary materials include polycarbonate, LDPE, HDPE, copolyester, polystyrene, Acrylonitrile Butadiene Styrene (ABS), polypropylene, and polyethylene, for example. In addition, these materials may be mixed, combined, or impregnated with a different type of material to impart additional rigidity, impact resistance, or lower coefficient of friction, or all three. Some exemplary additional materials include Teflon®, glass, carbon, etc. In a preferred embodiment, the top 102, bottom 104, and sides 108 are made of glass filled polycarbonate.

The tracks 122 may be molded or formed as part of the removable optical disc storage cartridges 100 and 200, or it may be molded separately and then assembled into the removable optical disc storage cartridges 100 and 200. Additionally, it may be made out of the same material as the removable optical disc storage cartridges 100 and 200, noted above. To provide for a greater frictionless surface for the extractors 118 to operate on, the material of the tracks 122 may also be mixed, combined, or impregnated with additional materials such as Teflon®, glass, carbon, etc. In a preferred embodiment, the security front doors 110 and 210 and extractors 118 are made of Teflon® filled polycarbonate.

In one embodiment, the tracks 122 are molded or formed into the inner side wall 404 during manufacturing of the removable optical disc storage cartridges 100 and 200. In another embodiment, the tracks 122 are manufactured and then secured to the inner side wall 404 of the removable optical disc storage cartridges 100 and 200. In the preferred embodiment, each track 122 accompanies one extractor 118, and each extractor 118 slides along its designated track 122 for transporting an optical disc 120 to and from the picker.

In one embodiment, the extractors 118 and extractor tabs 116 are made by a molding process or assembly of molded or manufactured parts, and it is made from a rigid moldable material. Some exemplary materials include polycarbonate, LDPE, HDPE, copolyester, polystyrene, Acrylonitrile Butadiene Styrene (ABS), polypropylene, and polyethylene, for example. In addition, these materials may be mixed, combined, or impregnated with a different type of material to impart additional rigidity, impact resistance, or lower coefficient of friction, or both. Some exemplary additional materials include Teflon®, glass, carbon, etc. In addition, the materials of the removable optical disc storage cartridges 100 and 200, extractors 118, extractor tabs 116, and tracks 122 may be different materials.

Although there has been described what is at present considered to be the preferred embodiments of the present removable optical disc storage cartridge, it will be understood that the removable optical disc storage cartridge can be embodied in other specific forms without departing from the spirit or essential characteristics thereof. For example, various shapes and sizes for the removable optical disc storage cartridge may be used other than those noted. In addition, other cartridge and optical disc identification means, extractor tabs, and extractors may be employed without departing from the spirit or essential characteristics thereof. The scope of the invention is indicated by the appended claims rather than the foregoing description.

What is claimed:

1. A removable optical disc storage cartridge for use in an optical disc storage library, comprising:
    a plurality of track means located within said removable optical disc storage cartridge;
    a plurality of extractor means, each of said plurality of extractor means located on a separate one of said plurality of track means, for holding an optical disc media in each of said plurality of extractor means in a substantially stacked orientation;
    a plurality of individual extractor tabs, each of said plurality of individual extractor tabs accessible outside of said removable optical disc storage cartridge and connected to one of said plurality of extractor means for slideably moving said one of said plurality of extractor means between a retracted position and an extended position through an opening in said removable optical disc storage cartridge;
    a hinged door for sealing said opening of said removable optical disc storage cartridge;
    a lock tab connected to said rectangular shaped housing and collinear with said extractor tabs; and
    a lock tab slot connected to said hinged door wherein said lock tab engages said lock tab slot to lock and unlock said hinged door.

2. The removable optical disc storage cartridge of claim 1 further comprising:
    extractor tab sealing means for preventing contaminants from entering said removable optical disc storage cartridge.

3. The removable optical disc storage cartridge of claim 1 wherein each of said plurality of track means comprises:
    two opposing lateral track means inwardly facing each other extending substantially the length of said removable optical disc storage cartridge.

4. The removable optical disc storage cartridge of claim 1 further comprising:
    release means and opening means to enable a picker in said optical disc storage library to release said lock tab and open said hinged door.

5. The removable optical disc storage cartridge of claim 1 further comprising:
    a cartridge identifier that contains information related to said plurality of optical disc media stored within said removable optical disc storage cartridge.

6. The removable optical disc storage cartridge of claim 5 wherein said cartridge identifier is a barcode.

7. The removable optical disc storage cartridge of claim 5 wherein said cartridge identifier is a RFID chip.

8. The removable optical disc storage cartridge of claim 5 wherein said information is selected from the group consisting of optical disc media identification, optical disc media format, optical disc media size, optical disc media capacity, and optical disc media manufacturer.

9. The removable optical disc storage cartridge of claim 1 wherein said optical disc media includes a barcode located near the hub of said optical disc media, said barcode containing information selected from the group consisting of optical disc media identification, optical disc media format, optical disc media size, optical disc media capacity, and optical disc media manufacturer.

10. The removable optical disc storage cartridge of claim 1 further comprising:
    automation grip means for providing a grippable portion of said removable optical disc storage cartridge to a transport means located within said optical disc storage library.

11. A removable optical disc storage cartridge for use in an optical disc storage library, comprising:
    a rectangular shaped housing having predetermined exterior dimensions and having an opening in one end thereof;
    a plurality of tracks located within said rectangular shaped housing, each of said plurality of tracks comprising:
        a pair of opposing tracks located along the inside surface of the side walls of said rectangular shaped housing;
    a plurality of extractors, each of said plurality of extractors located between a separate one of said pair of opposing tracks, for holding an optical disc media in each of said plurality of extractors in a substantially stacked orientation;
    a plurality of individual extractor tabs, each of said plurality of individual extractor tabs accessible outside of said rectangular shaped housing and connected through individual extractor slots to one of said plurality of extractors for slideably moving said one of said plurality of extractors between a retracted position and an extended position through said opening in said rectangular shaped housing;
    a hinged door for sealing said opening of said rectangular shaped housing;
    a lock tab connected to said rectangular shaped housing and collinear with said extractor tabs;
    a lock tab slot connected to said hinged door wherein said lock tab engages said lock tab slot to lock and unlock said hinged door; and
    a cartridge identifier located on said rectangular shaped housing for reading by a reader of said optical disc storage library.

12. The removable optical disc storage cartridge of claim 11 wherein the side walls of said rectangular shaped housing comprise:
    an inner side wall and an outer side wall, said inner side wall and said outer side wall having slots to allow each of said plurality of extractor tabs to connect to its separate one of said plurality of extractors.

13. The removable optical disc storage cartridge of claim 11 further comprising:
    release means and opening means to enable a picker in said optical disc storage library to release said lock tab and open said hinged door.

14. The removable optical disc storage cartridge of claim 11 wherein said cartridge identifier is selected from the group consisting of: a barcode and a RFID chip.

15. The removable optical disc storage cartridge of claim 11 wherein said reader is selected from the group consisting of a barcode reader and a RFID chip reader.

16. The removable optical disc storage cartridge of claim 11 further comprising:
    an automation grip element for providing a grippable portion of said rectangular shaped housing to a transport element within said optical disc storage library.

* * * * *